United States Patent [19]

Newsome et al.

[11] 4,413,716
[45] Nov. 8, 1983

[54] FRICTION CLUTCHES

[75] Inventors: Thomas B. Newsome; Garry Fulford, both of Sheffield, England

[73] Assignee: Laycock Engineering Limited, Sheffield, United Kingdom

[21] Appl. No.: 229,762

[22] Filed: Jan. 29, 1981

[30] Foreign Application Priority Data

Feb. 19, 1980 [GB] United Kingdom ............... 8005519

[51] Int. Cl.³ ...................... F16D 13/72; F16D 13/74
[52] U.S. Cl. .............................. 192/70.12; 192/113 B
[58] Field of Search ..................... 192/70.12, 113 B; 188/71.6, 264 B, 264 E

[56] References Cited

U.S. PATENT DOCUMENTS

| 3,610,384 | 10/1971 | Borck | 192/113 B |
| 3,921,778 | 11/1975 | Sugiura et al. | 192/113 B |

FOREIGN PATENT DOCUMENTS

| 694385 | 7/1953 | United Kingdom . |
| 702092 | 1/1954 | United Kingdom . |
| 1101471 | 1/1968 | United Kingdom . |
| 1389515 | 4/1975 | United Kingdom . |

*Primary Examiner*—Allan D. Herrmann
*Attorney, Agent, or Firm*—Merriam, Marshall & Bicknell

[57] ABSTRACT

A friction clutch incorporates a flywheel 11, a driven plate 23, and pressure plate 16 with friction interfaces 24 and 25 between pairs of these members lubricated and/or cooled by fluid flung out centrifugally. A generally bell shaped distribution member constituted by a conical member 41 and part of the driven plate hub member 33 directs fluid past the interface 25 to a passage leading outward to the interface 24. Apertures 47 around the circumference of the distribution member allow some fluid to escape through the distribution member through a radial passage to the interface 25. Substantially equal distribution of oil between the two interfaces is achieved.

3 Claims, 3 Drawing Figures

FRICTION CLUTCHES

BACKGROUND TO THE INVENTION

The invention relates to friction clutches of the kind in which a fluid such as oil is used to lubricate and/or cool the inter-engaging friction faces and which are generally known as wet clutches.

One type of wet friction clutch incorporates a driving member which is normally the engine flywheel and a pressure member which is normally referred to as a pressure plate and which is urged towards the flywheel. A driven member normally referred to as a driven plate is arranged between the flywheel and pressure plate. These members have inter-engaging friction faces which constitute one friction interface between the flywheel and driven plate and another friction interface between the driven plate and pressure plate. Torque is applied to the driven plate through both friction interfaces. In a wet clutch oil or a similar fluid is supplied, normally by centrifugal force, to the region of the friction faces of the driven plate and some of this oil finds its way to both the friction interfaces.

It has been appreciated in the past that a sufficient oil flow must be provided to the driven plate to prevent over-heating and to ensure that the friction faces are appropriately lubricated to provide consistent friction qualities and it has previously been proposed to control the total flow of oil to the driven plate in accordance with its operating conditions. However, despite a sufficient supply of oil to the driven plate, wet clutches do not always operate satisfactorily.

It is also known, for example from Deere & Company U.K. Patent Specification No. 1,389,515 and from General Motors U.K. Patent Specification No. 694,385 to control the oil flow to individual friction interfaces in a multi-plate clutch of the kind in which two or more plates are supported for longitudinal sliding movement along the outside of a generally cylindrical carrier for these plates. With such a clutch construction, internal lips or other barriers are provided at the ends of the cylinder to provide a reservoir into which oil is held by centrifugal force while the clutch is rotating. The oil is supplied to the interior of the cylinder by any suitable feed. Bleed holes are provided at suitable positions in the cylinder to allow oil to pass out through the cylinder under centrifugal force to the friction interfaces. Suitable positioning of the bleed holes gives even distribution among the interfaces.

This kind of arrangement for dividing oil flow between two interfaces of a clutch is not suitable for the kind of clutch in which the driven member incorporated a friction facing carrier plate rivetted or similarly secured to a splined hub. This kind of driven member is frequently used in single plate clutches intended for installation in a limited axial space and intended for use in situations where a low moment of inertia for the driven member is required. The limited space and low inertia requirements preclude the use of the known types of oil distribution system discussed above. Another disadvantage of the known oil distribution systems is that they require a high flow rate of oil to fill the reservoir and sufficient speed of the driven member to provide an adequate centrifugal force before even distribution of the oil can be achieved. With many clutches it is particularly important to achieve good oil distribution at low speeds or even when the driven member is stationary and when the rate of oil supply is low.

An object of the present invention is to provide an improved fluid supply to a wet clutch which overcomes the above mentioned disadvantages.

SUMMARY OF THE INVENTION

According to the present invention there is provided a friction clutch comprising a rotary driving member with a friction face; a pressure member which is rotatable with the driving member, has a friction face and can be urged towards the driving member; a driven member disposed between the driving and pressure members and having friction faces for engagement with the friction faces of the driving and pressure members so that these members can drive the driven member frictionally through a first interface between the driving member and the driven member and a second interface between the pressure member and the driven member; a supply of fluid to the friction faces of the driven member for cooling and/or lubricating the faces by means of which the fluid is flung outward by centrifugal force to the friction faces; characterised by the provision of means for dividing the fluid in controlled proportions between the two interfaces by means of a generally bell shaped distribution member which guides some fluid longitudinally and outward past a first passage leading outward to one interface to discharge the fluid in a second passage leading outward to the other interface and by means of apertures in the distribution member arranged so that some fluid escapes through them into the first passage, the divided flow then flowing outward under centrifugal force to the two interfaces.

The controlled proportions in which the fluid is divided may be equal proportions or unequal proportions depending on a variety of factors of the interfaces.

As a result of the controlled supply of fluid to the two clutch interfaces, it can be ensured that both interfaces are operated under optimum conditions. This results in full and effective utilization of both friction interfaces and ensures that the clutch can operate effectively and smoothly even when taking up drive in adverse conditions.

BRIEF DESCRIPTION OF THE DRAWINGS

An embodiment of the invention will now be described with reference to the accompanying drawings in which.

DESCRIPTION OF PREFERRED EMBODIMENTS

Figure 1:
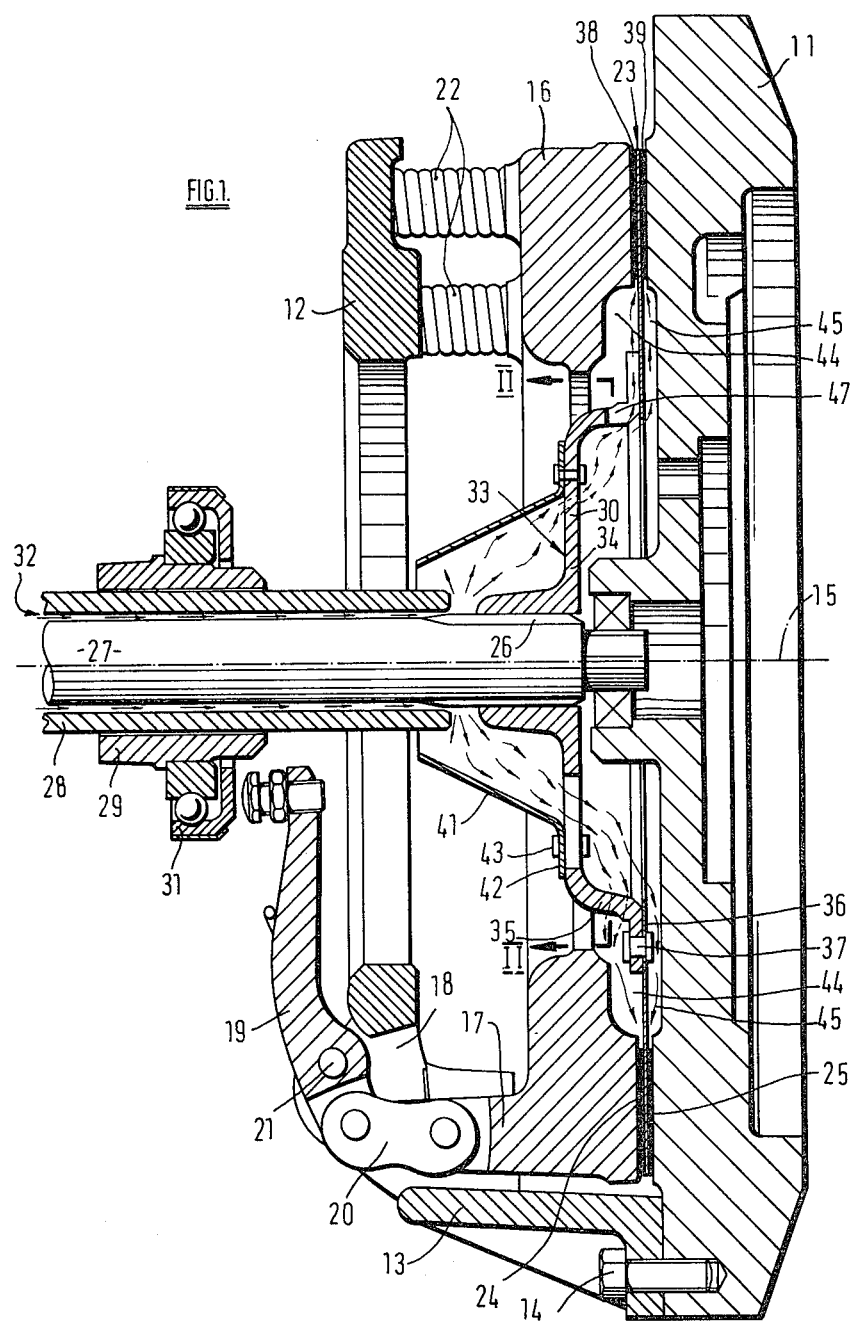
FIG. 1 is a diagrammatic cross-section through the whole clutch.
Figure 2:
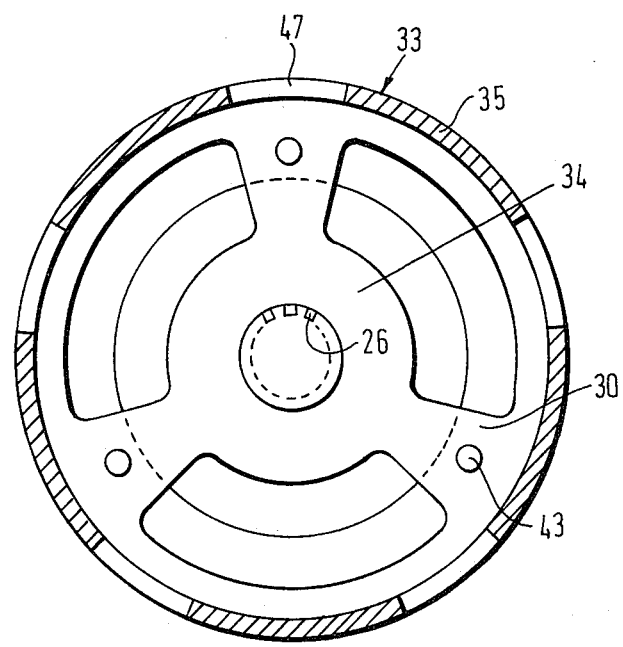
FIG. 2 is a section on line II—II of FIG. 1 showing the oil distribution member of the clutch.

The clutch of FIGS. 1 and 2 incorporates a rotary driving member or flywheel 11 driven by the crank shaft of an internal combustion engine (not shown). An annular clutch cover 12 is secured by means of integral legs 13 and bolts 14 to the flywheel 11 so that it rotates with the flywheel about rotational axis 15. The clutch cover 12 carries a pressure member in the form of a pressure plate 16 which is arranged to rotate with the cover 12 (and flywheel 11) by means of three lugs 17 (only one is shown) engaging in apertures 18 in the cover. Lugs 17 are also connected by means links 20 to release levers 19 which are pivoted to the cover 12 at 21 and hence serve to control axial movement of the pressure plate 16 with respect to the cover 12 and flywheel 11. Several coil springs 22 are arranged around the periphery of the clutch between the cover 12 and pressure plates 16 and serve to urge the pressure plate 16 towards the flywheel 11.

A driven member constituted by driven plate 23 is arranged between the pressure plate 16 and flywheel 11 and has opposed friction faces which engage with corresponding friction faces on the flywheel 11 and pressure plate 16. These friction faces provide one interface 24 between the driven plate and flywheel and another interface 25 between the driven plate and pressure plate. The driven plate (other parts of which will be described in greater detail subsequently) is connected through a splined connection 26 to a shaft 27 which constitutes the output shaft from the clutch and is normally a gearbox input shaft.

Output shaft 27 is surrounded by a fixed sleeve 28 on which can slide axially a guide 29 carrying a release bearing 31. In order to control the state of engagement of the clutch, guide 29 is moved axially to operate the release levers 19 in order to move the pressure plate 16 axially. When guide 29 is allowed to move in a direction away from the release levers, springs 22 urge the pressure plate 16 towards the flywheel 11 in order to clamp the driven plate 23 frictionally and establish a driving connection from flywheel 11 through the driven plate to output shaft 27. When guide 29 is moved towards the release levers 19, it causes the levers to pivot about their pivot 21 and to move pressure plate 16 away from the driven plate 23 against the force of springs 22. This releases the clutch.

A suitable fluid, normally oil, for lubricating and cooling the friction interfaces 24 and 25 is supplied to a central region of the clutch through a series of grooves 32 between output shaft 27 and sleeve 28. This oil is flung out generally radially by centrifugal force together with a flow of air as a mist or foam or series of droplets and finds its way to the friction interfaces 24 and 25 to provide lubrication and cooling.

As thus far described, without going into details of the driven plate or details of the oil flow, the clutch is entirely conventional and so has been described only briefly. The invention is concerned with details of the oil distribution, which in this example involves the driven plate, and these features will now be described in detail.

The driven plate, as shown in FIGS. 1 and 2, incorporates a hub member 33 with a central portion 34 splined at 26 to the output shaft 27, three radial spokes 30 and an outer rim 35. The hub member 33 is dished so that part of the rim 35 is offset axially from spokes 30 and central portion 34. As shown in FIG. 1, a friction facing carrier plate 36 is riveted at 37 at several locations around its periphery to the outer rim 35. Plate 36 carries two friction facings 38 and 39 which engage respectively with the friction faces on the flywheel 11 at pressure plate 16 and thus form the friction interfaces 24 and 25.

A frusto-conical guide member 41 with a radial flange 42 is riveted by means of this flange and rivets 43 to the outer region of the spokes 30. Guide 41 together with the dished part of hub member 33 together form a generally bell shaped distribution member which guides oil leaving the end of sleeve 28 towards the interfaces 24 and 25. Oil escapes from the end of sleeve 28 into a generally rotating environment so that it tends to fly outward by centrifugal force, not only on contact with solid parts of the clutch but also in an air stream which tends to rotate and move outward under centrifugal force. The bell shape of the distribution member causes the flow of oil to have an axial component as well as its radial component so that the flow of oil in the distribution member as thus far described is as shown in the lower part of FIG. 1. Thus the oil flows axially past the interface 24 and more particularly past a passage 44 between the pressure plate 16 and carrier plate 36 which leads to the interface 24. All of this oil is discharged into a passage 45 between the flywheel 11 and carrier plate 36 so that it flows in an outward direction through this passage to the interface 25.

The outer rim 35 of hub member 33 is provided with a series of six apertures 47 arranged around its periphery and these are best seen from FIG. 2. Oil guided by the distribution member and meeting these apertures tends to pass through the apertures and thus into the passage 44 which leads to interface 24. This oil flow is shown in the upper part of FIG. 1. In practice, with the continuously rotating parts of the clutch, oil is distributed evenly around the periphery of the components of the clutch at both interfaces rather than being distributed to one interface at one circumferential position and to the other interface at another circumferential position. The size of the apertures 47 in relation to the intervening continuous parts of the distribution member controls the proportions in which the oil is distributed between the two interfaces. If the conditions at the two interfaces are similar to each other, the apertures 47 should be arranged to give equal distribution. This does not necessarily means that the apertures should cover 50% of the circumference. The actual size of aperture 47 required to give equal oil distribution depends on several factors which are not readily quantifiable. The most convenient procedure is to use trial and error methods with a different number and/or size of apertures.

Figure 3:
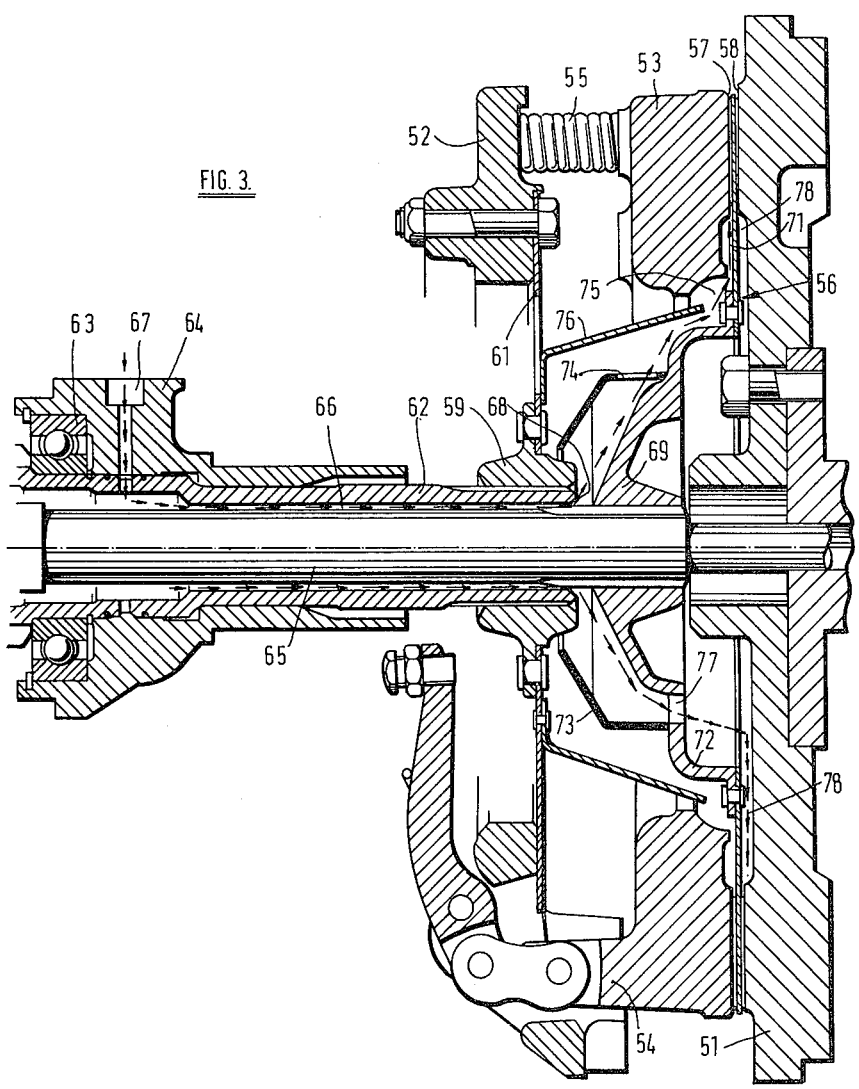
FIG. 3 is a view corresponding to that of FIG. 1 but showing the invention applied to a clutch with a permanently connected power take off.

The clutch shown in FIG. 3 bears some similarity to the clutch of FIGS. 1 and 2 but incorporates a permanently connected power take off drive and some modification to the oil distribution.

As in the embodiment of FIG. 1, the clutch incorporates a flywheel 51, a cover 52 which is secured to the flywheel outside the plane of section of FIG. 3 in a way similar to that shown in FIG. 1, a pressure plate 53 driven from the cover 52 through lugs 54 and urged towards the flywheel 51 by means of springs 55. A driven plate 56 is interposed between the flywheel 51 and pressure plate 53 in such a way as to provide a friction interface 57 with pressure plate 53 and a friction interface 58 with flywheel 51. As with the previous embodiment, the inner part of the driven plate is used in connection with the oil distribution and will be described subsequently.

A power take off splined hub 59 is driven from the cover 52 by means of a flexible steel diaphragm 61. Hub 59 is splined to a power take off sleeve 62 which runs in bearings 63 in a housing 64. A main clutch output shaft 65, which is driven from the driven plate in a way to be described, passes through sleeve 62 with a clearance providing an oil supply passage 66. Oil for lubricating and cooling the clutch is supplied under pressure from a connection 67 in the housing 64. As in the previous embodiment, this oil is released into the interior of the cutch from an annular opening 68 at the clutch end of the sleeve 62.

The means for dividing this oil flow and distributing it to the two interfaces 57 and 58, which incorporates the central part of the driven plate 56, will now be described. The driven plate incorporates a splined hub member 69 which at its inner end engages with co-operating splines on the shaft 65 and at its outer end is rivetted to a friction facing carrier 71. The friction facing carrier 71 is offset axially from the central part of the hub so that an outer part 72 of the hub forms part of a generally bell shaped oil distribution member. The remainder of the distribution member is constituted by a pressing 73 secured to the hub member and extending back beyond the opening 68 to ensure that it catches all oil released from this opening. A series of apertures 74 allow some of the oil which is moved in a combined axial and outward direction along the oil distribution member to escape into a passage 75 leading to the interface 57 as indicated by arrows in the top half of FIG. 3. A conical baffle 76 secured to the power take off drive forms a boundary for part of the passage 75 and ensures that the oil does not escape behind the pressure plate 53.

The remaining part of the oil flow is guided passed the apertures 74 through openings 77 in the hub, continues to be guided by the outer parts 72 of the oil distribution member and is finally discharged into radial passage 78 leading to the interface 58. This latter oil flow path is illustrated in the lower part of FIG. 3.

As with the embodiment of FIG. 1, the number and size of the apertures 74 should be adjusted to provide the desired division of the oil flow between the two interfaces 57 and 58. The fact that openings 57 cannot extend around the whole of the periphery of the hub 69 and so can provide some resistance to oil flow of the passage 78 can also influence the proportion of distribution.

With either embodiment, one factor which can influence the proportions in which oil is distributed is the speed of rotation of the clutch, or more particularly the speed of rotation of the various parts of the clutch because the driven plate may be stationary or rotating at a different speed from that of the flywheel immediately prior to clutch engagement. If the clutch is intended for use at a range of different speeds, the equal distribution should be achieved at a typical speed at which the clutch is normally engaged. In the case of an agricultural tractor for which the present invention is particularly suitable, only a limited range of engine speeds and thus of flywheel and clutch cover speeds is normally used so it is possible to achieve distribution of oil in the required proportions for all speeds used in practice. With an agricultural tractor, the driven plate is normally, but not always stationary during clutch engagement.

It may be that the conditions at the two interfaces differ from each other so that different proportions of the total oil flow are required at each interface. For example if the pressure plate acts as less of a heat sink than the flywheel, more than 50% of the oil may be required at that interface. It is even possible to use different friction materials at the two interfaces, again possibly resulting in different oil requirements.

Because both interfaces 24 and 25 can be lubricated and cooled to a desired extent it is possible to operate the clutch close to the upper theoretical limit of factors such as torque, slip speed and total energy dissipation without causing the clutch to deteriorate. These factors contribute to a high performance clutch with a long life.

We claim:

1. A friction clutch comprising a rotary driving member; a friction face on the rotary driving member; a pressure member which is rotatable with the driving member and can be urged towards the driving member; a friction face on the pressure member; a driven member disposed between the driving and pressure members; friction faces on the driven member for engagement with the friction faces of the driving and pressure members so that the latter members can drive the driven member frictionally through a first interface defined by the friction face of the driving member and one friction face of the driven member and a second interface defined by the friction face of the pressure member and the other friction face of the driven member; fluid supply means for supplying fluid to the friction faces of the driven member for cooling and lubrication of the faces, fluid from said supply means being flung outward in use by centrifugal force to the friction faces; characterized by the provision of means for dividing the fluid in controlled proportions between the two interfaces, said means comprising a generally bell shaped distribution member connected to said driven member for rotation therewith; a first passage leading outward to one interface; a second passage leading outward to the other interface; and apertures in the distribution member adjacent its connection with said driven member, said apertures facing generally radially outwardly and leading to said first passage so that some of said fluid passes through them into said first passage, the remainder of said fluid entering said second passage from the end of said distribution member.

2. A friction clutch according to claim 1 wherein said second passage is partly defined by apertures in said driven member adjacent the connection of said distribution member thereto.

3. A friction clutch according to claim 1 wherein said distribution member is defined in part by a hub member connected to said driven member.

* * * * *